Figure 1:
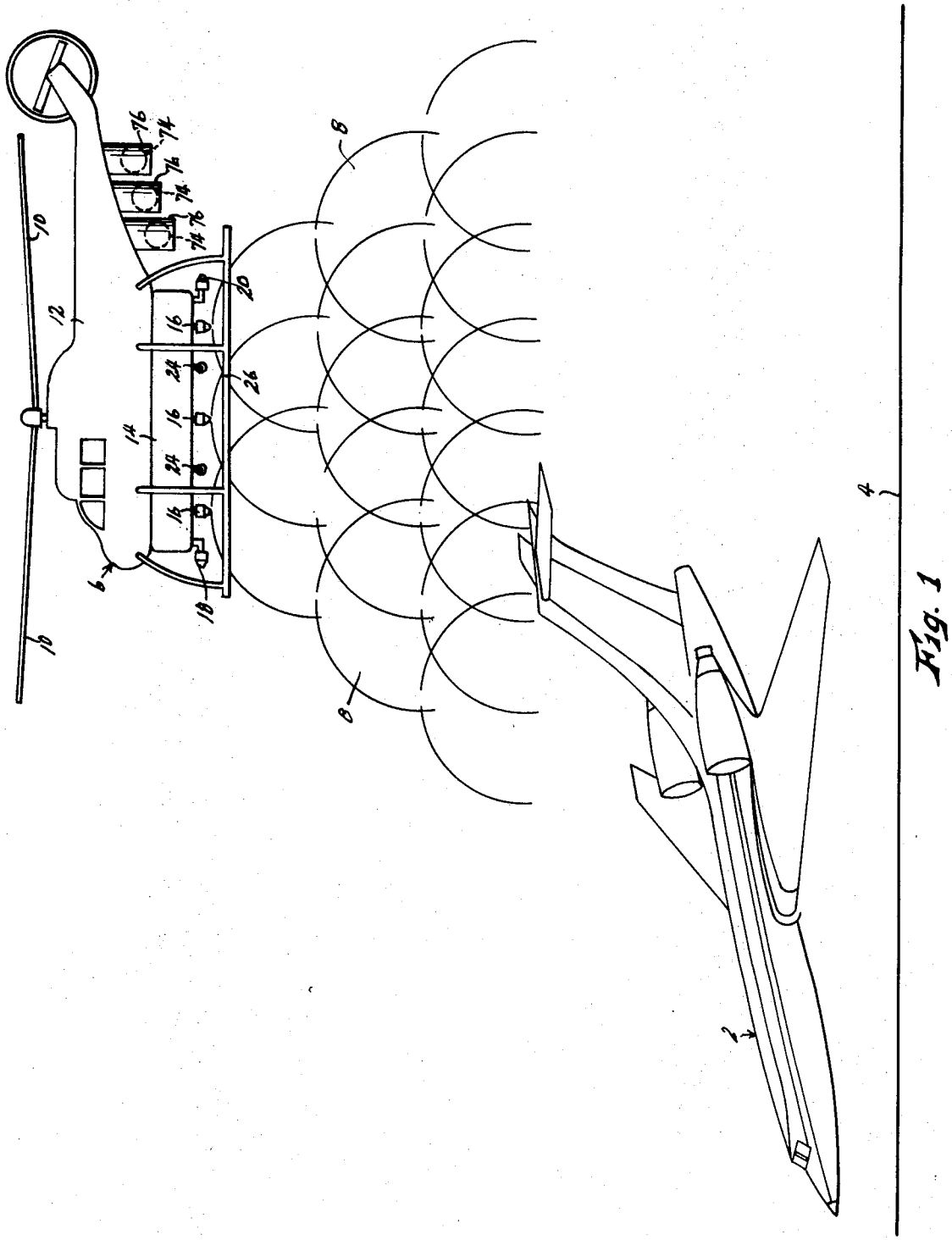

[11] 3,580,339

[72] Inventor David Nance
P.O. Box 16291, Phoenix, Ariz. 85011
[21] Appl. No. 795,171
[22] Filed Jan. 30, 1969
[45] Patented May 25, 1971

[54] METHOD AND APPARATUS FOR COMBATTING AIRCRAFT FIRES
5 Claims, 2 Drawing Figs.
[52] U.S. Cl. .................................................. 169/2,
169/31, 169/36, 244/136
[51] Int. Cl. ..................................................... A62c 3/06
[50] Field of Search........................................... 169/1, 2, 28, 30, 31, 36; 244/136

[56] References Cited
UNITED STATES PATENTS
| | | | |
|---|---|---|---|
| 2,003,300 | 6/1935 | Meigs............................ | 169/36 |
| 2,583,883 | 1/1952 | Ripper........................... | 244/136 |
| 2,665,768 | 1/1954 | Talbot........................... | 169/36 |
| 2,779,421 | 1/1957 | Rust.............................. | 169/1 |
| 3,220,482 | 11/1965 | Eveleth........................ | 244/136X |
| 3,442,334 | 5/1969 | Gousetis....................... | 169/2 |

*Primary Examiner*—Lloyd L. King
*Assistant Examiner*—Michael Y. Mar
*Attorney*—John A. Hamilton ABSTRACT: A method of combatting aircraft fires consisting of hovering an emergency aircraft, usually a helicopter, above an aircraft which has crash-landed or is in distress and is about to crashland, said helicopter thereby being positioned immediately above the aircraft either during or immediately after the crash landing, and being specially equipped to emit clouds of flame-smothering vapors to envelop the aircraft in trouble, whereby either to prevent fires or to immediately extinguish fires which may start, thereby to save large numbers of lives and incalculable amounts of property damage, and the apparatus for performing said method.

INVENTOR.
David Nance
BY John A. Hamilton
Attorney.

INVENTOR.
David Nance
BY John A. Hamilton
Attorney.

METHOD AND APPARATUS FOR COMBATTING AIRCRAFT FIRES

This invention relates to new and useful improvements in methods and apparatus for combatting fires, and has particular reference to methods and apparatus for fighting aircraft fires. Thousands of lives are lost each year, and billions of dollars of property damage is caused, as a result of aircraft fires. With the advent of supersonic transports capable of carrying 500 or more passengers in the near future, the prospect of the tragic multiplication of these loss figures is readily apparent. The part played by fire in these losses is tremendous. A large percentage of crashes and crash landings are not of the type which cause instant death to all persons aboard, but are in fact crash landings of varying degrees of severity which many persons survive, though perhaps unconscious, injured or otherwise trapped in the aircraft. However, many of these immediate survivors are subsequently killed by burning of the crashed aircraft. Most, perhaps 90 percent of the aircraft which crash do burn, the fires starting either at the instant of the crash, or within seconds thereafter. Most, again perhaps 90 percent, of aircraft crashes occur either during landing at or takeoff from an airport, or within a radius of a very few miles from an airport. Nevertheless, and despite the fact that at least the crew of a plane knows that a crash landing is imminent some time before it occurs, and can notify ground crews of this fact by radio, the crash landings often occur in areas which while close to an airport are difficult for fire trucks and other emergency ground vehicles to reach in time to prevent or combat any resultant fire effectively. In fact, even if a crash landing occurs directly on an airfield, the resulting fire is often out of control before crash trucks can reach the scene.

Accordingly, the principal object of the present invention is the provision of both an apparatus and method for more effectively preventing or fighting aircraft fires of the type described. Generally, the apparatus consists of a helicopter, specially equipped to emit voluminous clouds of flame-smothering vapor, mist, foam or the like downwardly therefrom. In the method, said helicopter, at least one of which could be based in a condition of continuous readiness at every airport, responds to the radio call of an aircraft in distress which knows it must crashland, taking to the air and positioning itself above the craft in distress and following it to its crash landing while emitting its flame-smothering clouds. Thus the distressed aircraft lands in enveloping clouds of flame-smothering vapor or the like, and the chances that the crashed aircraft will burn are greatly reduced. If the fire does occur, the helicopter can reach the scene to fight the fire much faster than any fire truck to better fight said fire.

If the helicopter arrives after a fire breaks out, or a fire should break out when the helicopter is hovering above a crashed plane, the intense rising heat may of course make it impossible for the helicopter to remain in position above the crash. Accordingly, a further object is the provision of means whereby the flame-smothering chemical of the helicopter may be directed horizontally in any direction, so that the helicopter may hover at the windward side of the crash and still fight the flames effectively.

A still further object is the provision of means on the helicopter for dropping fire-fighting "bombs." Such a bomb comprises a ball of rubber or the like containing a pressurized chemical. The dropped bomb explodes on contact with the ground and its contents are converted almost instantly into dense clouds of flame-smothering vapor. This permits a generally denser concentration of the vapor around the crash than is possible from the more distantly positioned helicopter, and hence is generally more effective in fighting actual fires.

Figure 2:
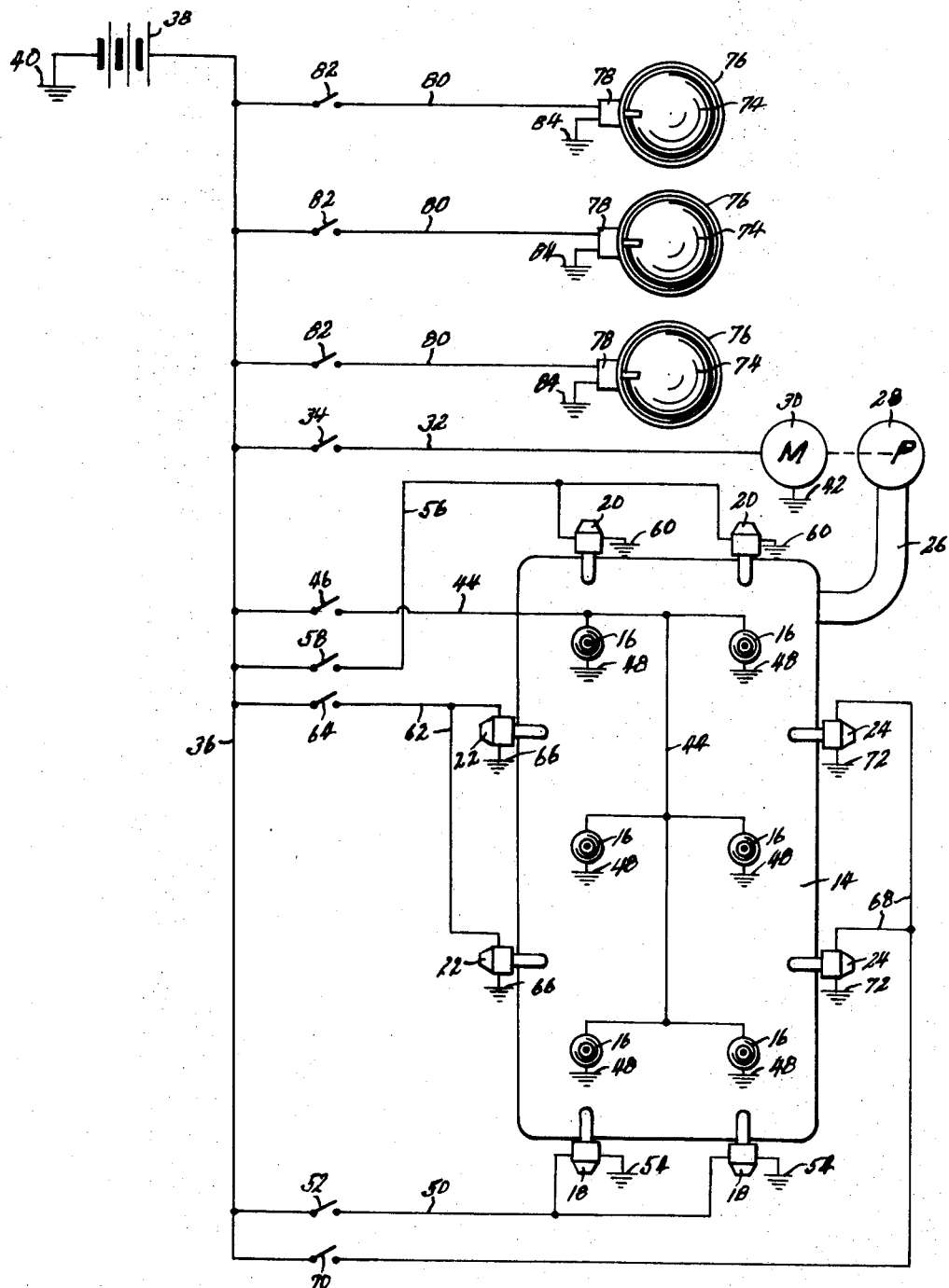

With these objects in view as well as other objects which will appear in the course of the specification, reference will be had to the accompanying drawing, wherein:

FIG. 1 is a diagram illustrating a method of combatting aircraft fires embodying the present invention, and including a helicopter constituting a fire-fighting apparatus embodying the present invention, and FIG. 2 is an inverted plan view of the helicopter tank, including a schematic diagram of the control system.

Like reference numerals apply to similar parts in both views of the drawing, and the numeral 2 applies to an aircraft in distress, about to make a crash landing on the ground 4. Let it be assumed that its pilot has radioed to a nearby airport that the crash landing is imminent. A specially equipped helicopter 6 is then dispatched to assume a position as shown, over aircraft 2, and maintains this position as the aircraft makes its crash landing. Before, during and after the crash landing, the helicopter emits clouds 8 of air-excluding, flame-smothering chemical vapor suitable for fighting the petroleum or electrical types of fires most likely to occur when the crash landing occurs. Ideally, aircraft 2 is enveloped in clouds 8 during and after its landing, in order to prevent starting of any fires, such fires otherwise having, as previously mentioned, about a 90 percent likelihood of occurring. If the helicopter cannot arrive in time for this procedure, it nevertheless can arrive faster than ground equipment, so as perhaps to still prevent fire, since fire sometimes does not break out for some time after a crash, or to fight and extinguish any fire which does occur.

Helicopter 6 is supported and propelled by the usual overhead blades 10, rotating on a vertical axis. These blades create a strong downdraft of air around the helicopter and this downdraft has at least two valuable functions in the firefighting operation just described. First, it tends to blow vapor clouds 8 downwardly to envelop aircraft 2 more rapidly than it would otherwise occur, since the vapor, while heavier than air and capable of settling downwardly by gravity, would otherwise do so more slowly. Secondly, the downdraft creates a draft of large amounts of cooler air from above downwardly over the helicopter itself. This tends to protect the helicopter from the heat of a crashed plane which has burst into flame, and thereby permits said helicopter to approach the crash more closely than would otherwise be possible.

Attached to the bottom of the fuselage 12 of the helicopter, or built into the lower portion of said fuselage, is a large tank 14 adapted to contain a liquid chemical which, when ejected from said tank under pressure into the atmosphere through suitable nozzles, is immediately converted into clouds of vapor or the like from which air is largely excluded, whereby to prevent burning of any object enveloped therein, and to smother flames if the object is already burning. Such chemicals are already commercially available. Said tank is equipped with a plurality of nozzles 16 adapted when open to direct chemical from said tank downwardly, nozzles 18 adapted to direct said chemical forwardly, nozzles 20 adapted to direct said chemical horizontally to the right, and nozzles 24 adapted to direct said chemical horizontally to the left. The number of nozzles directed in each direction will of course be determined by the capacity of each nozzle and the delivery rate of the chemical which may be desired. The helicopter must of course be provided with landing gear 26 extending far enough below fuselage 12 to protect tank 14 and the nozzles from damage when the helicopter lands.

Tank 14 is pressurized, whereby to eject the chemical firefighting liquid through any of the nozzles which are open, by air delivered thereto through a conduit 26 from an air pump 28 driven by an electric motor 30. Said motor is connected by wire 32 through a manually operable switch 34 to the hot lead wire 36 of a battery 38 or other source of electric power. The opposite terminal of said battery is grounded at 40, and the opposite terminal of motor 30 is grounded at 42. Thus the motor is energized, and tank 14 is pressurized, whenever switch 34 is closed.

It will be understood that each of nozzles 16, 18, 20, 22 and 24 includes electrically actuated control means operable to open said nozzle whenever electric current is furnished thereto. Said control means of all of nozzles 16 are connected by wires 44 through a single manually operable switch 46 to battery lead wire 36, the opposite terminal of each control means being grounded at 48, whereby nozzles 16 are opened whenever switch 46 is closed. Similarly, all of nozzles 18 are connected by wire 50 to lead wire 36 through switch 52 and grounded at 54, all of nozzles 20 are connected by wire 56 to lead wire 36 through switch 58 and grounded at 60, all of nozzles 22 are connected by wire 62 to lead wire 36 through switch 64 and grounded at 66, and all of nozzles 24 are connected by wire 68 to lead wire 36 through switch 70 and grounded at 72.

Normally, if the helicopter can position itself directly above aircraft 2, either before or after a crash landing, as is most desirable, only nozzles 16 will be opened, by closure of switch 46. However, if the crash landing has occurred and fire has broken out, the intense heat may render it impossible for the helicopter to maintain a position directly above aircraft 2. In these conditions, the helicopter may hover to one side of the wreck, preferably the windward side, and open the appropriate nozzles 18, 20, 22 or 24, by closure of the corresponding switches 52, 58, 64 or 70, to direct the fire-fighting chemical horizontally toward the wreck.

Also, the helicopter may carry a plurality of fire-fighting "bombs" 74, each bomb consisting of a hollow ball formed of rubber of the like and containing a pressurized chemical fire-fighting material, so that when the bomb is dropped and strikes either the aircraft 2 or the ground nearly, it bursts and emits dense clouds of vapor or the like which exclude air both to prevent and to smother fires. Each bomb is carried in a "bomb rack" 76 mounted on the helicopter, and which may constitute a vertical tube open at its lower end. Each bomb is carried in one of said racks, and is releasably retained therein by an electrically operable release mechanism 78 operable to release the associated bomb whenever electric current is supplied thereto. One terminal of each mechanism 78 is connected by a wire 80 to battery lead wire 36 through a manually operable switch 82, and the opposite terminal of each release mechanism is grounded at 84. Thus, each bomb 74 may be dropped whenever desired by closing the associated switch 82. The bombs are generally capable of supplying a denser, thicker concentration of flame-smothering vapor directly at and around a crashed aircraft than can be supplied by the nozzles, and hence are valuable tools for preventing or extinguishing fire in an aircraft which has already crashed, but they are of course ineffective to provide clouds of flame-smothering vapor to envelop the aircraft in trouble during its actual landing. Nozzles 18, 20, 22 and 24 are preferably of a type capable of ejecting the liquid chemical in thinner, more streamlined jets than nozzles 16, which may be of a spray type, whereby said jets travel farther from the nozzles, preferably outside of the strong downdraft of blades 10, before bursting into clouds of vapor. Thus the helicopter can hover at a substantial distance to the side of a wrecked plane and still fight the fire effectively, without the flame fighting chemical being driven down to the ground by the downdraft of blades 10 before it can reach the crashed craft.

What I claim as new and desire to protect by Letters Patent is:

1. A method of combatting aircraft fires consisting of the steps of:
    a. positioning an emergency aircraft above a distressed aircraft in flight but a crash landing of which is imminent,
    b. maintaining said emergency aircraft in said position during and after the crash landing of said distressed aircraft, and
    c. ejecting clouds of flame-smothering heavier-than-air vapor from said emergency aircraft, whereby said distressed aircraft is enveloped in said vapor during and after its crash landing.

2. The method as recited in claim 1 wherein said emergency aircraft is positioned either above or horizontally spaced apart from said distressed aircraft, and wherein said vapor clouds are ejected from said emergency aircraft selectively either downwardly or horizontally in any direction.

3. The method as recited in claim 1 with the additional step of directing a flow of cool air downwardly over said emergency aircraft, whereby said emergency aircraft is cooled and said flame-smothering vapor is urged downwardly toward said distressed aircraft.

4. Apparatus for combatting aircraft fires comprising:
    a. an emergency aircraft capable of assuming a flight position above an aircraft in flight but in distress and about to execute a crash landing, and capable of maintaining said position before, during, and after said crash landing, and
    b. means carried by said emergency aircraft for ejecting clouds of flame-smothering, heavier-than-air vapor, said ejecting means comprising a tank carried by said emergency aircraft for containing a pressurized liquid chemical solution which when ejected into the atmosphere bursts into clouds of flame-smothering, heavier-than-air vapor, a plurality of nozzles interconnected with said tank and through which said solution is ejected, said nozzles being normally closed and divided into sets directed downwardly and horizontally in various directions, and means whereby the nozzles of any of said sets of nozzles may be opened selectively.

5. Apparatus as recited in claim 4 wherein said emergency aircraft is a helicopter equipped with the usual overhead propelling blades operable to create a strong downdraft of air around the fuselage thereof, said nozzles being disposed beneath said blades, said downwardly directed nozzles being of a spray type whereby the chemical solution ejected therefrom bursts into vapor close to the tips of the nozzles, and said horizontally directed nozzles being of a jet type whereby the chemical solution ejected therefrom remains in liquid jet form to a point not beneath said propelling blades.